(12) United States Patent
Jean

(10) Patent No.: US 11,726,919 B2
(45) Date of Patent: *Aug. 15, 2023

(54) DYNAMIC L2P CACHE

(71) Applicant: Micron Technology, Inc., Boise, ID (US)

(72) Inventor: Sebastien Andre Jean, Meridian, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/471,538

(22) Filed: Sep. 10, 2021

(65) Prior Publication Data

US 2021/0406187 A1 Dec. 30, 2021

Related U.S. Application Data

(63) Continuation of application No. 16/534,710, filed on Aug. 7, 2019, now Pat. No. 11,119,933, which is a
(Continued)

(51) Int. Cl.
*G06F 12/08* (2016.01)
*G06F 12/0871* (2016.01)
(Continued)

(52) U.S. Cl.
CPC ........ *G06F 12/0871* (2013.01); *G06F 9/5016* (2013.01); *G06F 9/544* (2013.01);
(Continued)

(58) Field of Classification Search
None
See application file for complete search history.

(56) References Cited

U.S. PATENT DOCUMENTS

| 9,734,066 B1 | 8/2017 | Indupuru et al. |
| 10,409,726 B2 | 9/2019 | Jean |

(Continued)

FOREIGN PATENT DOCUMENTS

| CN | 102054137 A | 5/2011 |
| CN | 103562843 A | 2/2014 |

(Continued)

OTHER PUBLICATIONS

"Korean Application Serial No. 10-2020-7014899, Response filed Mar. 8, 2022 to Notice of Preliminary Rejection dated Jan. 28, 2022", 1 pg.

(Continued)

*Primary Examiner* — Kevin Verbrugge
(74) *Attorney, Agent, or Firm* — Schwegman Lundberg & Woessner, P.A.

(57) ABSTRACT

Disclosed in some examples are methods, systems, and machine readable mediums that dynamically adjust the size of an L2P cache in a memory device in response to observed operational conditions. The L2P cache may borrow memory space from a donor memory location, such as a read or write buffer. For example, if the system notices a high amount of read requests, the system may increase the size of the L2P cache at the expense of the write buffer (which may be decreased). Likewise, if the system notices a high amount of write requests, the system may increase the size of the L2P cache at the expense of the read buffer (which may be decreased).

20 Claims, 8 Drawing Sheets

Related U.S. Application Data continuation of application No. 15/797,812, filed on Oct. 30, 2017, now Pat. No. 10,409,726.

(51) Int. Cl.
  *G06F 9/54* (2006.01)
  *G06F 9/50* (2006.01)
  *G06F 12/02* (2006.01)

(52) U.S. Cl.
  CPC .. *G06F 12/0246* (2013.01); *G06F 2212/1021* (2013.01); *G06F 2212/222* (2013.01); *G06F 2212/502* (2013.01); *G06F 2212/7201* (2013.01)

(56) References Cited

U.S. PATENT DOCUMENTS

| | | |
|---|---|---|
| 11,119,933 B2 | 9/2021 | Jean |
| 2004/0052135 A1 | 3/2004 | Le |
| 2011/0022819 A1 | 1/2011 | Post et al. |
| 2012/0096225 A1 | 4/2012 | Khawand et al. |
| 2013/0124794 A1 | 5/2013 | Bux et al. |
| 2014/0337560 A1 | 11/2014 | Chun et al. |
| 2015/0356019 A1 | 12/2015 | Johar et al. |
| 2018/0074722 A1 | 3/2018 | Iwai |
| 2018/0121121 A1 | 5/2018 | Mehra et al. |
| 2019/0129856 A1 | 5/2019 | Jean |
| 2019/0361812 A1 | 11/2019 | Jean |

FOREIGN PATENT DOCUMENTS

| | | |
|---|---|---|
| CN | 104115231 A | 10/2014 |
| CN | 111433753 A | 7/2020 |
| CN | 111433753 | 11/2021 |
| CN | 114116535 | 3/2022 |
| TW | 457427 B | 10/2001 |
| TW | 201301031 A | 1/2013 |
| TW | 201931131 | 8/2019 |
| WO | WO-2012166304 A2 | 12/2012 |
| WO | 2019089193 | 5/2019 |

OTHER PUBLICATIONS

"Chinese Application Serial No. 201880078171.2, Response filed May 24, 2021 to Office Action dated Jan. 15, 2021", w English Claims, 25 pgs.

"Korean Application Serial No. 10-2020-7014899, Notice of Preliminary Rejection dated Jan. 28, 2022", w English translation, 9 pgs.

"Chinese Application Serial No. 201880078171.2, Office Action dated Jan. 15, 2021", w/English translation, 16 pgs.

"Chinese Application Serial No. 201880078171.2, Voluntary Amendment Filed Nov. 9, 2020", w/ English Claims, 29 pgs.

"International Application Serial No. PCT/US2018/054995, International Preliminary Report on Patentability dated May 14, 2020", 9 pgs.

"International Application Serial No. PCT/US2018/054995, International Search Report dated Feb. 19, 2019", 3 pgs.

"International Application Serial No. PCT/US2018/054995, Written Opinion dated Feb. 19, 2019", 7 pgs.

"Taiwanese Application Serial No. 107138349, Office Action dated Jun. 20, 2019", w/ English Translation, 15 pgs.

"Taiwanese Application Serial No. 107138349, Response filed Dec. 20, 2019 to Office Action dated Jun. 20, 2019", w/ English Claims, 51 pgs.

"Korean Application Serial No. 10-2020-7014899, Final Office Action dated Jul. 26, 2022", with English translation, 8 pages.

DYNAMIC L2P CACHE

PRIORITY APPLICATION

This application is a continuation of U.S. application Ser. No. 16/534,710, filed Aug. 7, 2019, which is a continuation of U.S. application Ser. No. 15/797,812, filed Oct. 30, 2017, now issued as U.S. Pat. No. 10,409,726, all of which are incorporated herein by reference in their entirety.

BACKGROUND

Memory devices are typically provided as internal, semiconductor, integrated circuits in computers or other electronic devices. There are many different types of memory, including volatile and non-volatile memory.

Volatile memory requires power to maintain its data, and includes random-access memory (RAM), dynamic random-access memory (DRAM), or synchronous dynamic random-access memory (SDRAM), among others.

Non-volatile memory can retain stored data when not powered, and includes flash memory, read-only memory (ROM), electrically erasable programmable ROM (EEPROM), static RAM (SRAM), erasable programmable ROM (EPROM), resistance variable memory, such as phase-change random-access memory (PCRAM), resistive random-access memory (RRAM), magnetoresistive random-access memory (MRAM), or 3D XPoint™ memory, among others.

Flash memory is utilized as non-volatile memory for a wide range of electronic applications. Flash memory devices typically include one or more groups of one-transistor, floating gate or charge trap memory cells that allow for high memory densities, high reliability, and low power consumption.

Two common types of flash memory array architectures include NAND and NOR architectures, named after the logic form in which the basic memory cell configuration of each is arranged. The memory cells of the memory array are typically arranged in a matrix. In an example, the gates of each floating gate memory cell in a row of the array are coupled to an access line (e.g., a word line). Ina NOR architecture, the drains of each memory cell in a column of the array are coupled to a data line (e.g., a bit line). In a NAND architecture, the drains of each memory cell in a string of the array are coupled together in series, source to drain, between a source line and a bit line.

Both NOR and NAND architecture semiconductor memory arrays are accessed through decoders that activate specific memory cells by selecting the word line coupled to their gates. In a NOR architecture semiconductor memory array, once activated, the selected memory cells place their data values on bit lines, causing different currents to flow depending on the state at which a particular cell is programmed. In a NAND architecture semiconductor memory array, a high bias voltage is applied to a drain-side select gate (SGD) line. Word lines coupled to the gates of the unselected memory cells of each group are driven at a specified pass voltage (e.g., Vpass) to operate the unselected memory cells of each group as pass transistors (e.g., to pass current in a manner that is unrestricted by their stored data values). Current then flows from the source line to the bit line through each series coupled group, restricted only by the selected memory cells of each group, placing current encoded data values of selected memory cells on the bit lines.

Each flash memory cell in a NOR or NAND architecture semiconductor memory array can be programmed individually or collectively to one or a number of programmed states. For example, a single-level cell (SLC) can represent one of two programmed states (e.g., 1 or 0), representing one bit of data.

However, flash memory cells can also represent one of more than two programmed states, allowing the manufacture of higher density memories without increasing the number of memory cells, as each cell can represent more than one binary digit (e.g., more than one bit). Such cells can be referred to as multi-state memory cells, multi-digit cells, or multi-level cells (MLCs). In certain examples, MLC can refer to a memory cell that can store two bits of data per cell (e.g., one of four programmed states), a triple-level cell (TLC) can refer to a memory cell that can store three bits of data per cell (e.g., one of eight programmed states), and a quad-level cell (QLC) can store four bits of data per cell. MLC is used herein in its broader context, to can refer to any memory cell that can store more than one bit of data per cell (i.e., that can represent more than two programmed states).

Traditional memory arrays are two-dimensional (2D) structures arranged on a surface of a semiconductor substrate. To increase memory capacity for a given area, and to decrease cost, the size of the individual memory cells has decreased. However, there is a technological limit to the reduction in size of the individual memory cells, and thus, to the memory density of 2D memory arrays. In response, three-dimensional (3D) memory structures, such as 3D NAND architecture semiconductor memory devices, are being developed to further increase memory density and lower memory cost.

Such 3D NAND devices often include strings of storage cells, coupled in series (e.g., drain to source), between one or more source-side select gates (SGSs) proximate a source, and one or more drain-side select gates (SGDs) proximate a bit line. In an example, the SGSs or the SGDs can include one or more field-effect transistors (FETs) or metal-oxide semiconductor (MOS) structure devices, etc. In some examples, the strings will extend vertically, through multiple vertically spaced tiers containing respective word lines. A semiconductor structure (e.g., a polysilicon structure) may extend adjacent a string of storage cells to form a channel for the storages cells of the string. In the example of a vertical string, the polysilicon structure may be in the form of a vertically extending pillar. In some examples the string may be "folded," and thus arranged relative to a U-shaped pillar. In other examples, multiple vertical structures may be stacked upon one another to form stacked arrays of storage cell strings.

Memory arrays or devices can be combined together to form a storage volume of a memory system, such as a solid-state drive (SSD), a Universal Flash Storage (UFS™) device, a MultiMediaCard (MMC) solid-state storage device, an embedded MMC device (eMMCT™), etc. An SSD can be used as, among other things, the main storage device of a computer, having advantages over traditional hard drives with moving parts with respect to, for example, performance, size, weight, ruggedness, operating temperature range, and power consumption. For example, SSDs can have reduced seek time, latency, or other delay associated with magnetic disk drives (e.g., electromechanical, etc.). SSDs use non-volatile memory cells, such as flash memory cells to obviate internal battery supply requirements, thus allowing the drive to be more versatile and compact.

An SSD can include a number of memory devices, including a number of dies or logical units (e.g., logical unit numbers or LUNs), and can include one or more processors or other controllers performing logic functions required to operate the memory devices or interface with external systems. Such SSDs may include one or more flash memory die, including a number of memory arrays and peripheral circuitry thereon. The flash memory arrays can include a number of blocks of memory cells organized into a number of physical pages. In many examples, the SSDs will also include DRAM or SRAM (or other forms of memory die or other memory structures). The SSD can receive commands from a host in association with memory operations, such as read or write operations to transfer data (e.g., user data and associated integrity data, such as error data and address data, etc.) between the memory devices and the host, or erase operations to erase data from the memory devices.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Disclosed in some examples are methods, systems, and machine readable mediums that dynamically adjust the size of an L2P cache in a memory device in response to observed operational conditions. The L2P cache may reallocate memory space from a donor memory location, such as a read buffer, a write buffer, or both a read and a write buffer. For example, if the system notices a high amount of read requests, the system may increase the size of the L2P cache at the expense of the write buffer (which may be decreased). Thus volatile memory that was assigned by a firmware to a write buffer (or read buffer) may instead be reallocated to the L2P cache. Likewise, if the system notices a high amount of write requests, the system may increase the size of the L2P cache at the expense of the read buffer (which may be decreased). In some examples, the increase may be temporary and the L2P cache may go back to its normal size in response to changing operational conditions. By increasing the size of the L2P cache, the NAND device may increase the probability of a cache hit and increase performance.

Electronic devices, such as mobile electronic devices (e.g., smart phones, tablets, etc.), electronic devices for use in automotive applications (e.g., automotive sensors, control units, driver-assistance systems, passenger safety or comfort systems, etc.), and Internet-connected appliances or devices (e.g., internet-of-things (IoT) devices, etc.), have varying storage needs depending on, among other things, the type of electronic device, use environment, performance expectations, etc.

Electronic devices can be broken down into several main components: a processor (e.g., a central processing unit (CPU) or other main processor); memory (e.g., one or more volatile or non-volatile random-access memory (RAM) memory device, such as dynamic RAM (DRAM), mobile or low-power double-data-rate synchronous DRAM (DDR SDRAM), etc.); and a storage device (e.g., non-volatile memory (NVM) device, such as flash memory, read-only memory (ROM), an SSD, an MMC, or other memory card structure or assembly, etc.). In certain examples, electronic devices can include a user interface (e.g., a display, touchscreen, keyboard, one or more buttons, etc.), a graphics processing unit (GPU), a power management circuit, a baseband processor or one or more transceiver circuits, etc.

Figure 1:
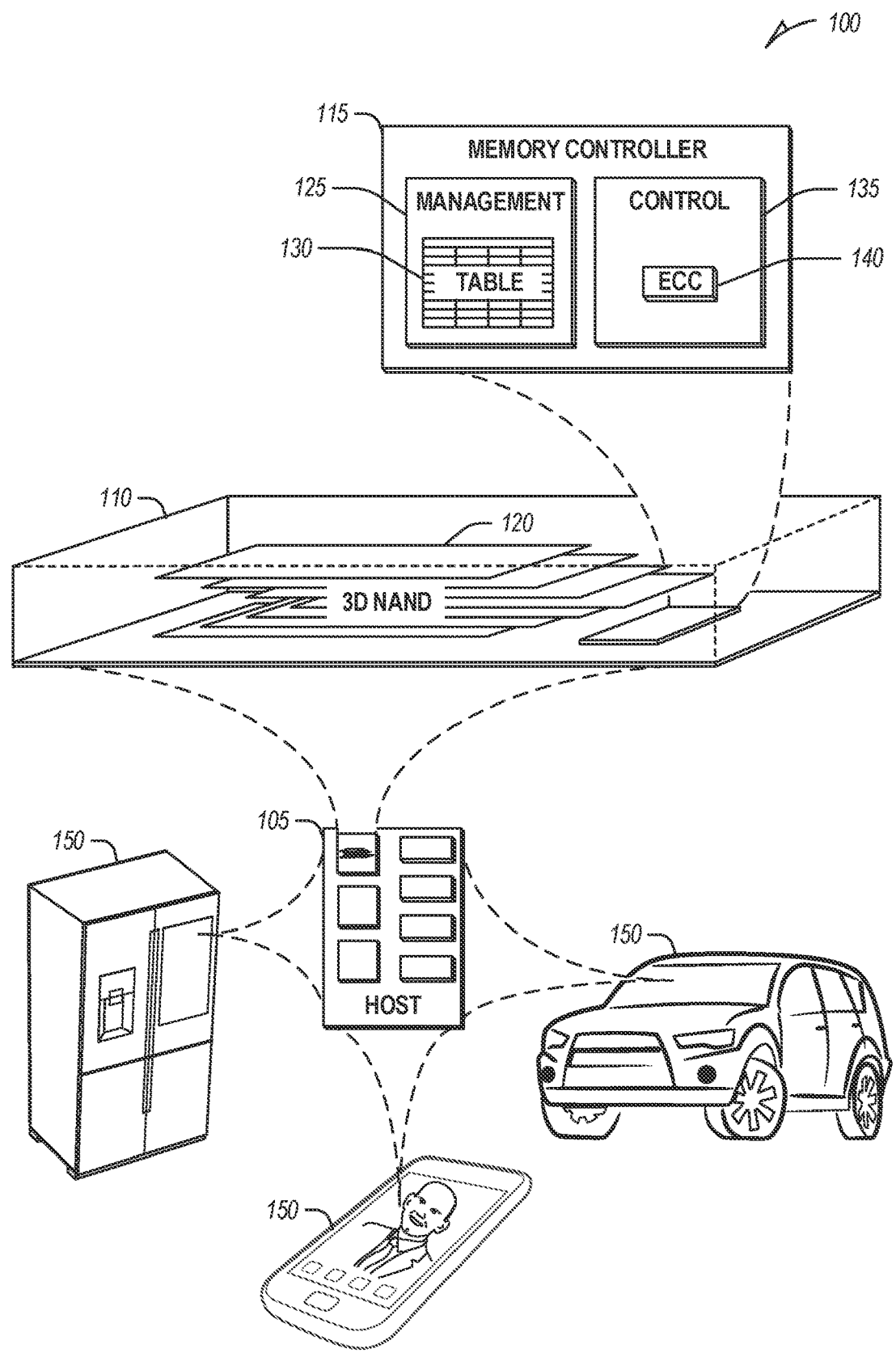
FIG. 1 illustrates an example of an environment including a memory device.

FIG. 1 illustrates an example of an environment 100 including a host device 105 and a memory device 110 configured to communicate over a communication interface. The host device 105 or the memory device 110 may be included in a variety of products 150, such as Internet of Things (IoT) devices (e.g., a refrigerator or other appliance, sensor, motor or actuator, mobile communication device, automobile, drone, etc.) to support processing, communications, or control of the product 150.

The memory device 110 includes a memory controller 115 and a memory array 120 including, for example, a number of individual memory die (e.g., a stack of three-dimensional (3D) NAND die). In 3D architecture semiconductor memory technology, vertical structures are stacked, increasing the number of tiers, physical pages, and accordingly, the density of a memory device (e.g., a storage device). In an example, the memory device 110 can be a discrete memory or storage device component of the host device 105. In other examples, the memory device 110 can be a portion of an integrated circuit (e.g., system on a chip (SOC), etc.), stacked or otherwise included with one or more other components of the host device 105.

One or more communication interfaces can be used to transfer data between the memory device 110 and one or more other components of the host device 105, such as a Serial Advanced Technology Attachment (SATA) interface, a Peripheral Component Interconnect Express (PCIe) interface, a Universal Serial Bus (USB) interface, a Universal flash Storage (UFS) interface, an eMMC™ interface, or one or more other connectors or interfaces. The host device 105 can include a host system, an electronic device, a processor, a memory card reader, or one or more other electronic devices external to the memory device 110. In some examples, the host 105 may be a machine having some portion, or all, of the components discussed in reference to the machine 800 of FIG. 8.

The memory controller 115 can receive instructions from the host 105, and can communicate with the memory array, such as to transfer data to (e.g., write or erase) or from (e.g., read) one or more of the memory cells, planes, sub-blocks, blocks, or pages of the memory array. The memory controller 115 can include, among other things, circuitry or firmware, including one or more components or integrated circuits. For example, the memory controller 115 can include one or more memory control units, circuits, or components configured to control access across the memory array 120 and to provide a translation layer between the host 105 and the memory device 110. The memory controller 115 can include one or more input/output (I/O) circuits, lines, or interfaces to transfer data to or from the memory array 120. The memory controller 115 can include a memory manager 125 and an array controller 135.

The memory manager 125 can include, among other things, circuitry or firmware, such as a number of components or integrated circuits associated with various memory management functions. For purposes of the present description example memory operation and management functions will be described in the context of NAND memory. Persons skilled in the art will recognize that other forms of non-volatile memory may have analogous memory operations or management functions. Such NAND management functions include wear leveling (e.g., garbage collection or reclamation), error detection or correction, block retirement, or one or more other memory management functions. The memory manager 125 can parse or format host commands (e.g., commands received from a host) into device commands (e.g., commands associated with operation of a memory array, etc.), or generate device commands (e.g., to accomplish various memory management functions) for the array controller 135 or one or more other components of the memory device 110.

The memory manager 125 can include a set of management tables 130 configured to maintain various information associated with one or more component of the memory device 110 (e.g., various information associated with a memory array or one or more memory cells coupled to the memory controller 115). For example, the management tables 130 can include information regarding block age, block erase count, error history, or one or more error counts (e.g., a write operation error count, a read bit error count, a read operation error count, an erase error count, etc.) for one or more blocks of memory cells coupled to the memory controller 115. In certain examples, if the number of detected errors for one or more of the error counts is above a threshold, the bit error can be referred to as an uncorrectable bit error. The management tables 130 can maintain a count of correctable or uncorrectable bit errors, among other things.

The array controller 135 can include, among other things, circuitry or components configured to control memory operations associated with writing data to, reading data from, or erasing one or more memory cells of the memory device 110 coupled to the memory controller 115. The memory operations can be based on, for example, host commands received from the host 105, or internally generated by the memory manager 125 (e.g., in association with wear leveling, error detection or correction, etc.).

The array controller 135 can include an error correction code (ECC) component 140, which can include, among other things, an ECC engine or other circuitry configured to detect or correct errors associated with writing data to or reading data from one or more memory cells of the memory device 110 coupled to the memory controller 115. The memory controller 115 can be configured to actively detect and recover from error occurrences (e.g., bit errors, operation errors, etc.) associated with various operations or storage of data, while maintaining integrity of the data transferred between the host 105 and the memory device 110, or maintaining integrity of stored data (e.g., using redundant RAID storage, etc.), and can remove (e.g., retire) failing memory resources (e.g., memory cells, memory arrays, pages, blocks, etc.) to prevent future errors.

The memory array 120 can include several memory cells arranged in, for example, a number of devices, planes, sub-blocks, blocks, or pages. As one example, a 48 GB TLC NAND memory device can include 18,592 bytes (B) of data per page (16,384+2208 bytes), 1536 pages per block, 548 blocks per plane, and 4 or more planes per device. As another example, a 32 GB MLC memory device (storing two bits of data per cell (i.e., 4 programmable states)) can include 18,592 bytes (B) of data per page (16,384+2208 bytes), 1024 pages per block, 548 blocks per plane, and 4 planes per device, but with half the required write time and twice the program/erase (PIE) cycles as a corresponding TLC memory device. Other examples can include other numbers or arrangements. In some examples, a memory device, or a portion thereof, may be selectively operated in SLC mode, or in a desired MLC mode (such as TLC, QLC, etc.).

In operation, data is typically written to or read from the NAND device 110 in pages, and erased in blocks. However, one or more memory operations (e.g., read, write, erase, etc.) can be performed on larger or smaller groups of memory cells, as desired. The data transfer size of a NAND memory device 110 is typically referred to as a page, whereas the data transfer size of a host is typically referred to as a sector.

Although a page of data can include a number of bytes of user data (e.g., a data payload including a number of sectors of data) and its corresponding metadata, the size of the page often refers only to the number of bytes used to store the user data. As an example, a page of data having a page size of 4 KB may include 4 KB of user data (e.g., 8 sectors assuming a sector size of 512 B) as well as a number of bytes (e.g., 32 B, 54 B, 224 B, etc.) of metadata corresponding to the user data, such as integrity data (e.g., error detecting or correcting code data), address data (e.g., logical address data, etc.), or other metadata associated with the user data.

Different types of memory cells or memory arrays 120 can provide for different page sizes, or may require different amounts of metadata associated therewith. For example, different memory device types may have different bit error rates, which can lead to different amounts of metadata necessary to ensure integrity of the page of data (e.g., a memory device with a higher bit error rate may require more bytes of error correction code data than a memory device with a lower bit error rate). As an example, a multi-level cell (MLC) NAND flash device may have a higher bit error rate than a corresponding single-level cell (SLC) NAND flash device. As such, the MLC device may require more metadata bytes for error data than the corresponding SLC device.

Figure 2:
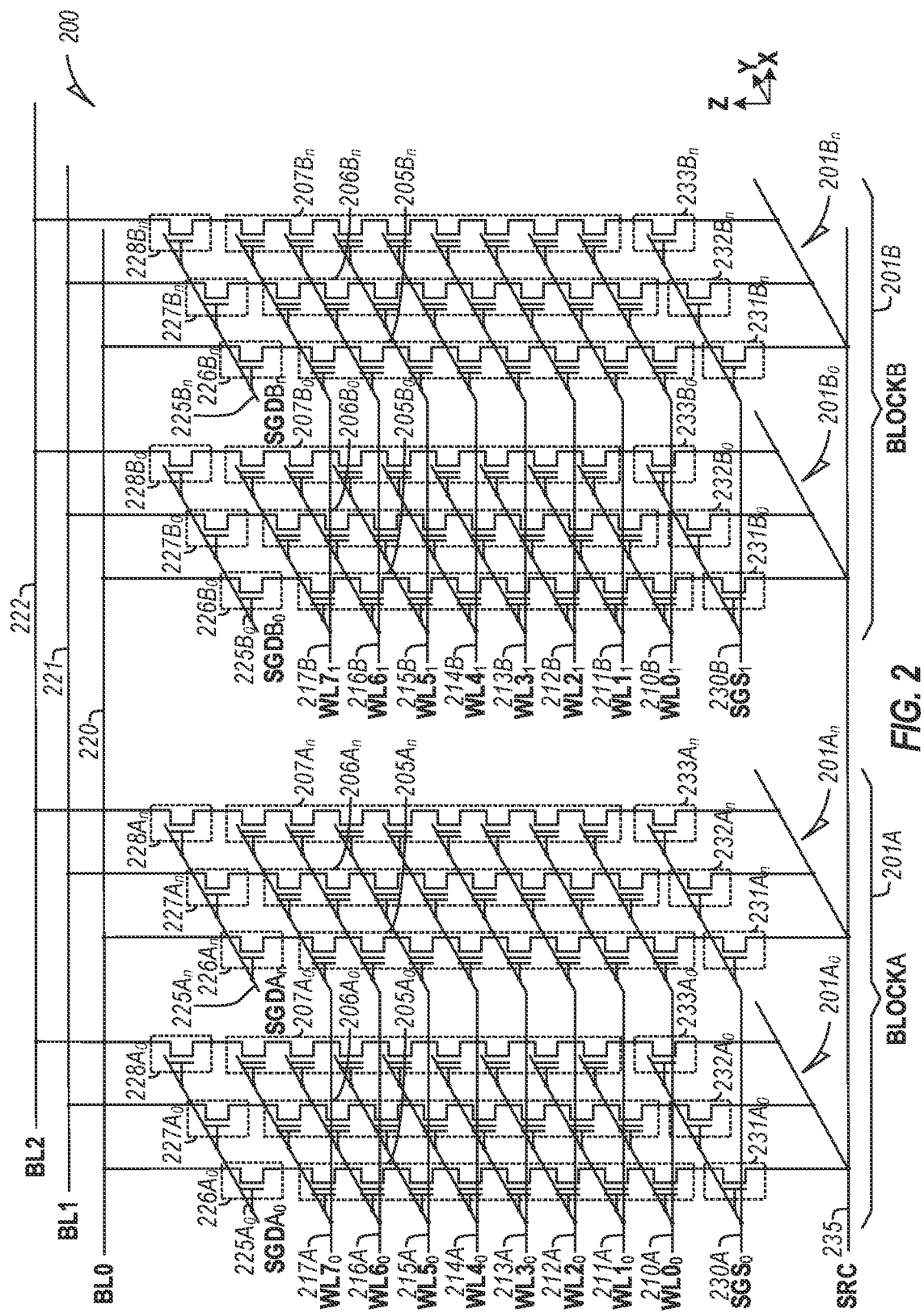
FIGS. 2-3 illustrate schematic diagrams of an example of a 3D NAND architecture semiconductor memory array.

FIG. 2 illustrates an example schematic diagram of a 3D NAND architecture semiconductor memory array 200 including a number of strings of memory cells (e.g., first-third $A_0$ memory strings $205A_0$-$207A_0$, first-third $A_n$ memory strings $205A_n$-$207A_n$, first-third $B_0$ memory strings $205B_0$-$207B_0$, first-third $B_n$ memory strings $205B_n$-$207B_n$, etc.), organized in blocks (e.g., block A 201A, block B 201B, etc.) and sub-blocks (e.g., sub-block $A_0$ 201$A_0$, sub-block $A_n$ 201$A_n$, sub-block $B_0$ 201$B_0$, sub-block $B_n$ 201$B_n$, etc.). The memory array 200 represents a portion of a greater number of similar structures that would typically be found in a block, device, or other unit of a memory device.

Each string of memory cells includes a number of tiers of charge storage transistors (e.g., floating gate transistors, charge-trapping structures, etc.) stacked in the Z direction, source to drain, between a source line (SRC) 235 or a source-side select gate (SGS) (e.g., first-third $A_0$ SGS $231A_0$-$233A_0$, first-third $A_n$ SGS $231A_n$-$233A_n$, first-third $B_0$ SGS $231B_0$-$233B_0$, first-third $B_n$ SGS $231B_n$-$233B_n$, etc.) and a drain-side select gate (SGD) (e.g., first-third $A_0$ SGD $226A_0$-$228A_0$, first-third $A_n$ SGD $226A_n$-$228A_n$, first-third $B_0$ SGD $226B_0$-$228B_0$, first-third $B_n$ SGD $226B_n$-

228$B_n$, etc.). Each string of memory cells in the 3D memory array can be arranged along the X direction as data lines (e.g., bit lines (BL) BL0-BL2 220-222), and along the Y direction as physical pages.

Within a physical page, each tier represents a row of memory cells, and each string of memory cells represents a column. A sub-block can include one or more physical pages. A block can include a number of sub-blocks (or physical pages) (e.g., 128, 256, 384, etc.). Although illustrated herein as having two blocks, each block having two sub-blocks, each sub-block having a single physical page, each physical page having three strings of memory cells, and each string having 8 tiers of memory cells, in other examples, the memory array 200 can include more or fewer blocks, sub-blocks, physical pages, strings of memory cells, memory cells, or tiers. For example, each string of memory cells can include more or fewer tiers (e.g., 16, 32, 64, 128, etc.), as well as one or more additional tiers of semiconductor material above or below the charge storage transistors (e.g., select gates, data lines, etc.), as desired. As an example, a 48 GB TLC NAND memory device can include 18,592 bytes (B) of data per page (16,384+2208 bytes), 1536 pages per block, 548 blocks per plane, and 4 or more planes per device.

Each memory cell in the memory array 200 includes a control gate (CG) coupled to (e.g., electrically or otherwise operatively connected to) an access line (e.g., word lines (WL) $WL0_0$-$WL7_0$ 210A-217A, $WL0_1$-$WL7_1$210B-217B, etc.), which collectively couples the control gates (CGs) across a specific tier, or a portion of a tier, as desired. Specific tiers in the 3D memory array, and accordingly, specific memory cells in a string, can be accessed or controlled using respective access lines. Groups of select gates can be accessed using various select lines. For example, first-third $A_0$ SGD $226A_0$-$228A_0$ can be accessed using an $A_0$ SGD line $SGDA_0$ $225A_0$, first-third $A_n$ SGD $226A_n$-$228A_n$ can be accessed using an $A_n$ SGD line $SGDA_n$ $225A_n$, first-third $B_0$ SGD $226B_0$-$228B_0$ can be accessed using an $B_0$ SGD line $SGDB_0$ $225B_0$, and first-third $B_n$ SGD $226B_n$-$228B_n$ can be accessed using an $B_n$ SGD line $SGDB_n$ $225B_n$. First-third $A_0$ SGS $231A_0$-$233A_0$ and first-third $A_n$ SGS $231A_n$-$233A_n$ can be accessed using a gate select line $SGS_0$ 230A, and first-third $B_0$ SGS $231B_0$-$233B_0$ and first-third $B_n$ SGS $231B_n$-$233B_n$ can be accessed using a gate select line $SGS_1$ 23013.

In an example, the memory array 200 can include a number of levels of semiconductor material (e.g., polysilicon, etc.) configured to couple the control gates (CGs) of each memory cell or select gate (or a portion of the CGs or select gates) of a respective tier of the array. Specific strings of memory cells in the array can be accessed, selected, or controlled using a combination of bit lines (BLs) and select gates, etc., and specific memory cells at one or more tiers in the specific strings can be accessed, selected, or controlled using one or more access lines (e.g., word lines).

Figure 3:
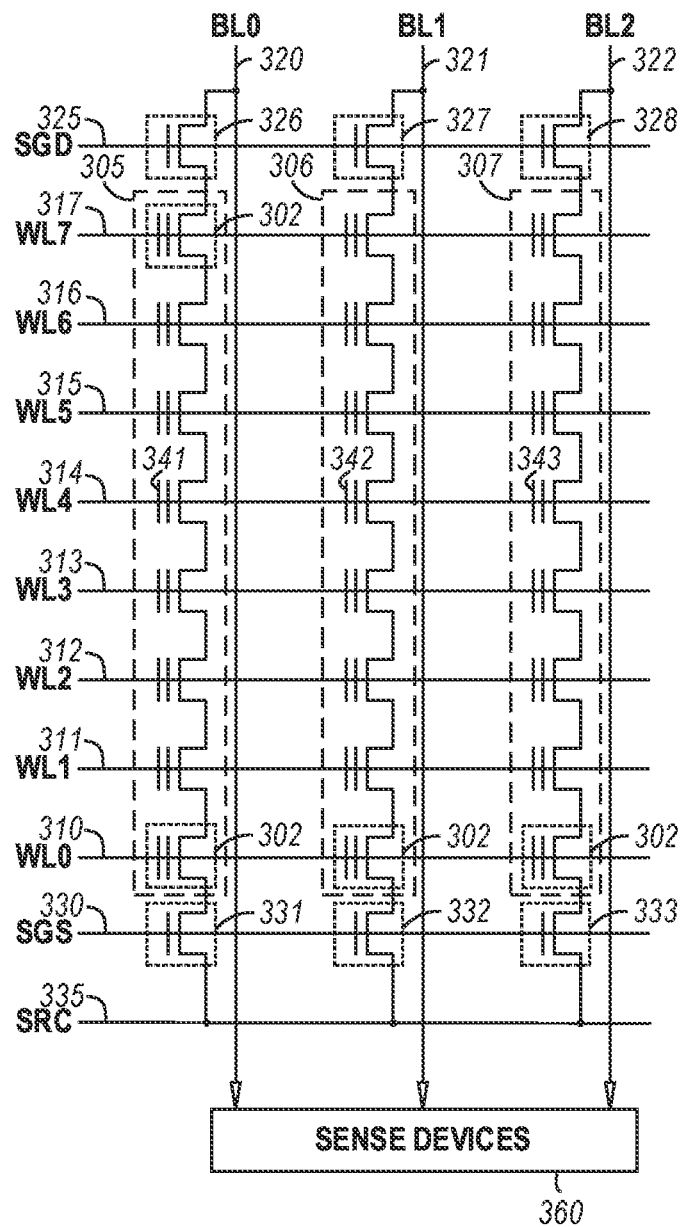

FIG. 3 illustrates an example schematic diagram of a portion of a NAND architecture semiconductor memory array 300 including a plurality of memory cells 302 arranged in a two-dimensional array of strings (e.g., first-third strings 305-307) and tiers (e.g., illustrated as respective word lines (WL) WL0-WL7 310-317, a drain-side select gate (SGD) line 325, a source-side select gate (SGS) line 330, etc.), and sense amplifiers or devices 360. For example, the memory array 300 can illustrate an example schematic diagram of a portion of one physical page of memory cells of a 3D NAND architecture semiconductor memory device, such as illustrated in FIG. 2.

Each string of memory cells is coupled to a source line (SRC) using a respective source-side select gate (SGS) (e.g., first-third SGS 331-333), and to a respective data line (e.g., first-third bit lines (BL) BL0-BL2 320-322) using a respective drain-side select gate (SGD) (e.g., first-third SGD 326-328). Although illustrated with 8 tiers (e.g., using word lines (WL) WL0-WL7 310-317) and three data lines (BL0-BL2 326-328) in the example of FIG. 3, other examples can include strings of memory cells having more or fewer tiers or data lines, as desired.

In a NAND architecture semiconductor memory array, such as the example memory array 300, the state of a selected memory cell 302 can be accessed by sensing a current or voltage variation associated with a particular data line containing the selected memory cell. The memory array 300 can be accessed (e.g., by a control circuit, one or more processors, digital logic, etc.) using one or more drivers. In an example, one or more drivers can activate a specific memory cell, or set of memory cells, by driving a particular potential to one or more data lines (e.g., bit lines BL0-BL2), access lines (e.g., word lines WL0-WL7), or select gates, depending on the type of operation desired to be performed on the specific memory cell or set of memory cells.

To program or write data to a memory cell, a programming voltage (Vpgm) (e.g., one or more programming pulses, etc.) can be applied to selected word lines (e.g., WL4), and thus, to a control gate of each memory cell coupled to the selected word lines (e.g., first-third control gates (CGs) 341-343 of the memory cells coupled to WL4). Programming pulses can begin, for example, at or near 15V, and, in certain examples, can increase in magnitude during each programming pulse application. While the program voltage is applied to the selected word lines, a potential, such as a ground potential (e.g., Vss), can be applied to the data lines (e.g., bit lines) and substrates (and thus the channels, between the sources and drains) of the memory cells targeted for programming, resulting in a charge transfer (e.g., direct injection or Fowler-Nordheim (FN) tunneling, etc.) from the channels to the floating gates of the targeted memory cells.

In contrast, a pass voltage (Vpass) can be applied to one or more word lines having memory cells that are not targeted for programming, or an inhibit voltage (e.g., Vcc) can be applied to data lines (e.g., bit lines) having memory cells that are not targeted for programming, for example, to inhibit charge from being transferred from the channels to the floating gates of such non-targeted memory cells. The pass voltage can be variable, depending, for example, on the proximity of the applied pass voltages to a word line targeted for programming. The inhibit voltage can include a supply voltage (Vcc), such as a voltage from an external source or supply (e.g., a battery, an AC-to-DC converter, etc.), relative to a ground potential (e.g., Vss).

As an example, if a programming voltage (e.g., 15V or more) is applied to a specific word line, such as WL4, a pass voltage of 10V can be applied to one or more other word lines, such as WL3, WL5, etc., to inhibit programming of non-targeted memory cells, or to retain the values stored on such memory cells not targeted for programming. As the distance between an applied program voltage and the non-targeted memory cells increases, the pass voltage required to refrain from programming the non-targeted memory cells can decrease. For example, where a programming voltage of 15V is applied to WL4, a pass voltage of 10V can be applied to WL3 and a pass voltage of 8V can be applied to WL2 and a pass voltage of 7V can be applied to WL1 and WL7, etc. In other examples, the pass voltages, or number of word lines, etc., can be higher or lower, or more or less.

The sense amplifiers 360, coupled to one or more of the data lines (e.g., first, second, or third bit lines (BL0-BL2) 320-322), can detect the state of each memory cell in respective data lines by sensing a voltage or current on a particular data line.

Between applications of one or more programming pulses (e.g., Vpgm), a verify operation can be performed to determine if a selected memory cell has reached its intended programmed state. If the selected memory cell has reached its intended programmed state, it can be inhibited from further programming. If the selected memory cell has not reached its intended programmed state, additional programming pulses can be applied. If the selected memory cell has not reached its intended programmed state after a particular number of programming pulses (e.g., a maximum number), the selected memory cell, or a string, block, or page associated with such selected memory cell, can be marked as defective.

To erase a memory cell or a group of memory cells (e.g., erasure is typically performed in blocks or sub-blocks), an erasure voltage (Vers) (e.g., typically Vpgm) can be applied to the substrates (and thus the channels, between the sources and drains) of the memory cells targeted for erasure (e.g., using one or more bit lines, select gates, etc.), while the word lines of the targeted memory cells are kept at a potential, such as a ground potential (e.g., Vss), resulting in a charge transfer (e.g., direct injection or Fowler-Nordheim (FN) tunneling, etc.) from the floating gates of the targeted memory cells to the channels.

Figure 4:
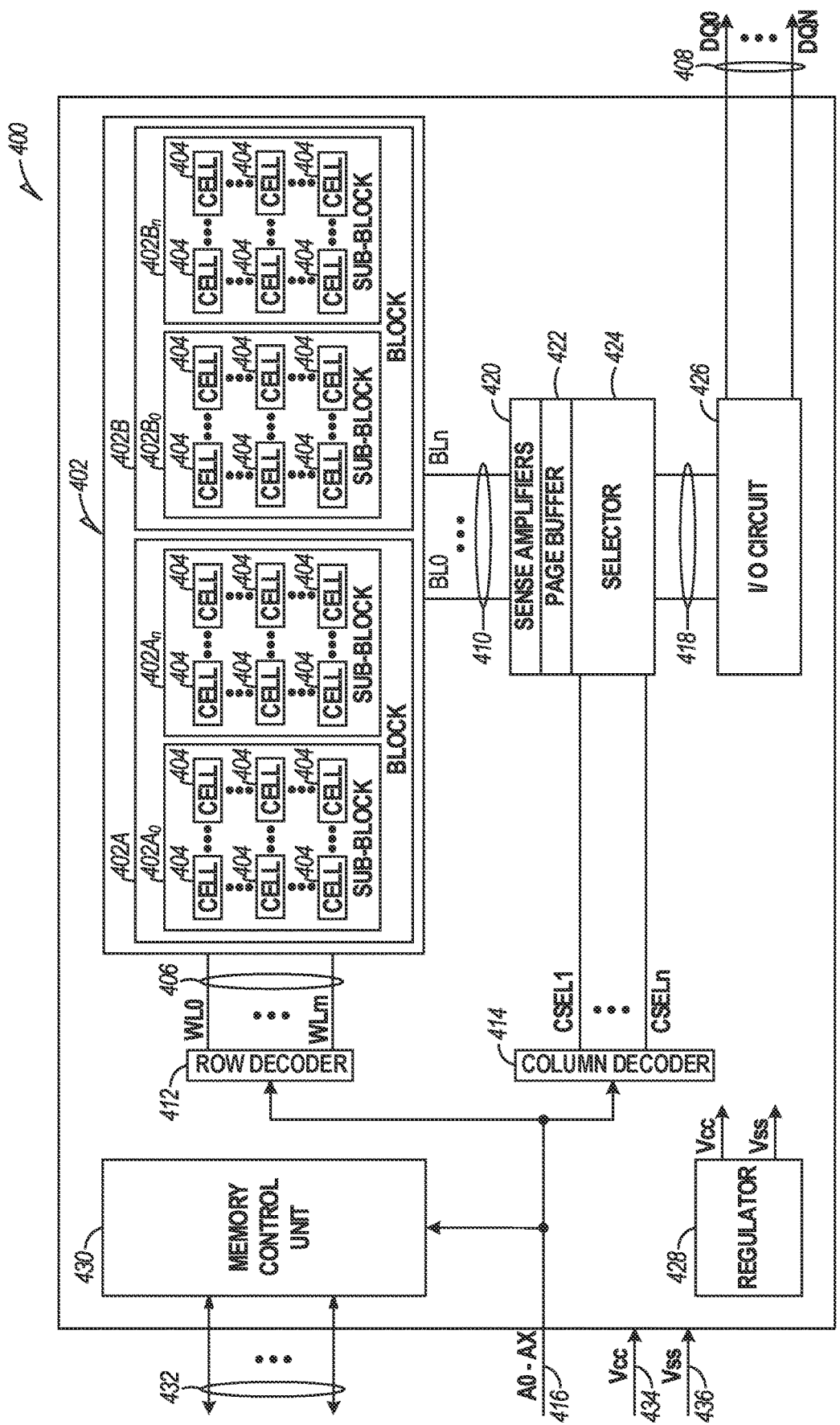
FIG. 4 illustrates an example block diagram of a memory module.

FIG. 4 illustrates an example block diagram of a memory device 400 including a memory array 402 having a plurality of memory cells 404, and one or more circuits or components to provide communication with, or perform one or more memory operations on, the memory array 402. The memory device 400 can include a row decoder 412, a column decoder 414, sense amplifiers 420, a page buffer 422, a selector 424, an input/output (I/O) circuit 426, and a memory control unit 430.

The memory cells 404 of the memory array 402 can be arranged in blocks, such as first and second blocks 402A, 402B. Each block can include sub-blocks. For example, the first block 402A can include first and second sub-blocks 402A$_0$, 402A$_n$, and the second block 402B can include first and second sub-blocks 402B$_0$, 402B$_n$. Each sub-block can include a number of physical pages, each page including a number of memory cells 404. Although illustrated herein as having two blocks, each block having two sub-blocks, and each sub-block having a number of memory cells 404, in other examples, the memory array 402 can include more or fewer blocks, sub-blocks, memory cells, etc. In other examples, the memory cells 404 can be arranged in a number of rows, columns, pages, sub-blocks, blocks, etc., and accessed using, for example, access lines 406, first data lines 410, or one or more select gates, source lines, etc.

The memory control unit 430 can control memory operations of the memory device 400 according to one or more signals or instructions received on control lines 432, including, for example, one or more clock signals or control signals that indicate a desired operation (e.g., write, read, erase, etc.), or address signals (A0-AX) received on one or more address lines 416. One or more devices external to the memory device 400 can control the values of the control signals on the control lines 432, or the address signals on the address line 416. Examples of devices external to the memory device 400 can include, but are not limited to, a host, a memory controller, a processor, or one or more circuits or components not illustrated in FIG. 4.

The memory device 400 can use access lines 406 and first data lines 410 to transfer data to (e.g., write or erase) or from (e.g., read) one or more of the memory cells 404. The row decoder 412 and the column decoder 414 can receive and decode the address signals (A0-AX) from the address line 416, can determine which of the memory cells 404 are to be accessed, and can provide signals to one or more of the access lines 406 (e.g., one or more of a plurality of word lines (WL0-WLm)) or the first data lines 410 (e.g., one or more of a plurality of bit lines (BL0-BLn)), such as described above.

The memory device 400 can include sense circuitry, such as the sense amplifiers 420, configured to determine the values of data on (e.g., read), or to determine the values of data to be written to, the memory cells 404 using the first data lines 410. For example, in a selected string of memory cells 404, one or more of the sense amplifiers 420 can read a logic level in the selected memory cell 404 in response to a read current flowing in the memory array 402 through the selected string to the data lines 410.

One or more devices external to the memory device 400 can communicate with the memory device 400 using the I/O lines (DQ0-DQN) 408, address lines 416 (A0-AX), or control lines 432. The input/output (I/O) circuit 426 can transfer values of data in or out of the memory device 400, such as in or out of the page buffer 422 or the memory array 402, using the I/O lines 408, according to, for example, the control lines 432 and address lines 416. The page buffer 422 can store data received from the one or more devices external to the memory device 400 before the data is programmed into relevant portions of the memory array 402, or can store data read from the memory array 402 before the data is transmitted to the one or more devices external to the memory device 400.

The column decoder 414 can receive and decode address signals (A0-AX) into one or more column select signals (CSEL1-CSELn). The selector 424 (e.g., a select circuit) can receive the column select signals (CSEL1-CSELn) and select data in the page buffer 422 representing values of data to be read from or to be programmed into memory cells 404. Selected data can be transferred between the page buffer 422 and the I/O circuit 426 using second data lines 418.

The memory control unit 430 can receive positive and negative supply signals, such as a supply voltage (Vcc) 434 and a negative supply (Vss) 436 (e.g., a ground potential), from an external source or supply (e.g., an internal or external battery, an AC-to-DC converter, etc.). In certain examples, the memory control unit 430 can include a regulator 428 to internally provide positive or negative supply signals.

Host software wishing to read, write, or erase data to the memory device issues a command specifying one or more logical block addresses (LBAs) that address one or more memory locations (e.g., memory pages) for the read, write, or erase. In contrast to magnetic storage, in NAND devices, these do not correspond to actual physical locations in the memory devices. Instead, these LBAs are mapped by the NAND to one or more physical pages of NAND memory cells using a logical-to-physical (L2P) table. The reason for this mapping is that the NAND cannot modify a value in the NAND—it must erase the value and then write the new value. Complicating this is that the NAND can only erase a block of memory (which has many pages) at a time. If the delete or modify request is for less than a block of memory, in order to fulfill this request and to preserve the data that is not supposed to be erased, the NAND would have to move all the valid pages to another block and then erase the old block (this process is termed garbage collection). This solution is slow, and also reduces NAND life as a NAND memory cell only has a limited number of program and erase cycles before it is no longer able to hold a charge.

As a result, when receiving a delete request or receiving a request to modify a value in memory, the NAND simply marks the old location as invalid and in the case of a modification, writes the new value to a new physical location (one or more pages) on the memory device. For modification requests, the NAND then updates its mapping of the LBA to the new physical location so that subsequent requests involving that LBA point to the correct physical location.

Eventually the NAND frees up the previously marked invalid pages to maintain the advertised level of storage. As previously noted, the NAND only erases blocks of data at a time. As a result of this, the NAND device first does garbage collection which copies the data in valid pages of a block that is to be erased into new pages of other blocks. Once the data is copied, the pages of the block to be erased are marked as invalid and the block may be erased.

The L2P table used to map logical addresses to physical addresses takes significant memory resources. For example, a NAND with 2 Gigabytes (GB) of storage may have a 2 MegaByte (MB) L2P table and a 128 GB NAND may be mapped with a 128 MB L2P table. NAND memory devices may have a controller (e.g., a CPU) which has internal memory (e.g., 1-2 MB) which may be divided into multiple banks. One bank is tightly coupled to the processor and is accessed in a single clock cycle. This tightly coupled RAM may be on the order of 256 Kbytes and stores firmware and data used by the firmware. The other banks (called multiple bank SRAM configuration—MRAM) are slower to access. The MRAM is typically 1-2 Mbytes and is slower than the tightly coupled memory.

As can be appreciated, the L2P table will not completely fit in either the tightly coupled memory or MRAM. While NAND memory devices may increase the amount of tightly coupled memory or MRAM, this increases complexity, size, and cost. Another approach is to have an area of MRAM (or in some examples, tightly coupled memory) that is a cache of the L2P table. The cache may indicate physical addresses for the most commonly, or most recently accessed logical blocks. Requests from the host for logical addresses in the cache are serviced using the cache. If the L2P cache does not contain a physical address for a given logical address, the NAND device must load that part of the L2P table from the NAND, This is called a cache miss and increases the amount of time that the NAND takes to service the request. The problem with the cache is that its size is relatively small— ranging from around 32 Kbytes to 128 Kbytes. A cache miss turns a host operation into two NAND operations: one to retrieve the L2P information necessary to service the host request and a second to actually service the request. Therefore, techniques to increase the number of cache hits has a measurable effect on performance.

Disclosed in some examples are methods, systems, and machine readable mediums that dynamically adjust the size of the L2P cache in a memory device in response to observed NAND operational conditions. The L2P cache may borrow memory space from a donor memory location (such as a read or write buffer). For example, if the system notices a high amount of read requests, the system may increase the size of the L2P cache at the expense of the write buffer (which may be decreased). Likewise, if the system notices a high amount of write requests, the system may increase the size of the L2P cache at the expense of the read buffer (which may be decreased). In some examples, the increase may be temporary and the L2P cache may go back to its normal size in response to changing operational conditions. For example, in response to an absence of a condition that prompted the increase. By increasing the size of the L2P cache, the NAND device may increase the probability of a cache hit and decrease the probability that a single NAND operation will require a second NAND operation to load L2P table information from the NAND.

In some examples, an L2P cache profile may specify cache behaviors based upon one or more NAND operational conditions. For example, the L2P cache profile may comprise one or more rules that describe under what operational conditions the cache increases from a default size, decreases back to the default size, by how much, how fast the size change happens, and from what other memory location to use for the L2P cache (e.g., the read, write, or other buffer). For example, one or more rules in the L2P cache profile may specify when the cache size increases from the default size and when to return the cache size to the default size.

The L2P cache profile may be static—that is, it may be loaded onto the NAND at manufacturing and persist (as a data structure on the NAND, or the volatile operating memory) unchanged. In other examples, a default L2P cache profile may be loaded on the NAND at the time of manufacturing, but may be subsequently modified—e.g., by a firmware of the NAND, an operating system of a host device (e.g., by sending changes through a host interface such as UFS), and the like. In some examples, the rules of the L2P cache profile may be instantiated as part of the firmware instructions.

Example operational conditions that may trigger an L2P cache size change may include one or more of: a host command queue depth size, the type of commands in the queue (e.g., read, write, erase, and other commands), a ratio between different types of commands in the queue (e.g., read/write ratio, write/read ratio), a L2P cache hit percentage, a L2P cache miss percentage, and the like. Rules may be of the form: if [operational condition] is [greater than, equal to, less than] [a determined value], then [increase/ decrease] the L2P cache by [amount] from [write or read] buffer.

In some examples, the cache increase is implemented immediately—that is the data in the donor memory may be immediately allocated to the L2P cache. In other examples, the system may wait until the donor memory (e.g., the write/and or read buffer) is free until implementing the L2P cache increase. In still other examples, the NAND may accelerate efforts to free the donor memory. In yet other examples, the L2P cache may be incrementally phased in over time. For example, at time t, the L2P cache may be increased by X KB and at time t+1 it may be increased another X KB (for a total increase over time t−1 of 2X KB).

As an example, an L2P cache rule in the profile may be that when a queue depth is over 5 commands where the majority of (e.g., over 50% ratio of read/write) commands are read commands, increase the L2P cache by 10% for every read command over 5 commands up to 25% by borrowing space from the write buffer. Another cache increase rule may be that when a queue depth is over 5 commands where the majority of commands are read commands, to increase the L2P cache by 10% for every command over 5 commands up to 25% by borrowing space from both the read and write buffers in a proportion based upon the proportion of read commands to write commands in the queue. Yet another example rule may be to increase the L2P cache if the L2P cache hit % is less than a predetermined value by taking from a read or write buffer.

Multiple rules may be defined and rules may stack—that is, if the operational conditions meet one or more increase rules, the cache may be increased for both of the rules. This may be the case if operating conditions are such so that multiple rules may be triggered. For example, given the L2P cache profile with the following rules:

queue depth is over 5 commands where the majority of (e.g., over 50% ratio of read/write) commands are read commands, increase the L2P cache by 10% for every read command over 5 commands up to 25% by borrowing space from the write buffer;

increase the L2P cache if the L2P cache hit % is less than a predetermined value by taking from a read buffer;

If the NAND's queue depth goes over 5 commands and of the commands in the queue buffer over 50% are read commands, the L2P cache may be increased at the expense of the write buffer. At the same time, if the L2P cache hit % is less than the predetermined value, the L2P cache may be increased even more. Similarly, rules may partially or totally cancel each other out for example, if operational conditions are such that one rule indicates to increase the L2P cache and another rule to decrease the L2P cache. In this case, the L2P cache may increase or decrease the size that is the sum of those rules. Rules may even decrease the L2P cache below the default size (at least temporarily).

Donor memory locations may include a read buffer that is used to buffer host read commands, a write buffer that buffers write data from the host, and the like. A donor memory location may be any memory location of a non-volatile memory that is not already allocated for use as the L2P cache.

Cache size rules may be defined that limit the amount that can be taken from each donor memory locations, for example, to prevent the L2P cache from taking too much memory from read or write buffers thereby degrading performance. In some examples, a rule may specify that if the donor memory buffer utilization % is above a predetermined threshold percentage that some or all of any memory loaned to the L2P cache is to be returned. In certain examples, this prevents the L2P cache from diverting memory from read/write buffers and degrading performance.

As noted, the L2P cache rules may also specify under what conditions the L2P cache may revert back to the default size. An example rule may specify that the L2P cache may revert back to default once a queue depth returns to a level below a predetermined threshold. In other examples, an example rule may specify that the decrease may happen as a function of time. That is, the initial L2P cache increase may decay over time until the L2P cache returns to its default size.

The L2P cache increase or decrease (e.g., the reallocation) may be accomplished in some examples by simply moving the pointers marking the boundaries of the L2P cache and the donor memory locations (e.g., read or write buffers). Since a write command changes the logical to physical mapping, these changes may be stored in an update list that is in a distinct memory location from the L2P cache. Thus, a host write may first check the L2P table for the L2P mapping, then check the update list to see if the L2P mapping was updated. Therefore, the entries of the L2P cache may always be "clean" that is, unmodified. Thus, when L2P cache entries are evicted as a result of the "snapback" of the L2P cache size, those entries are not lost, but are on the NAND or in the update list.

Figure 5:
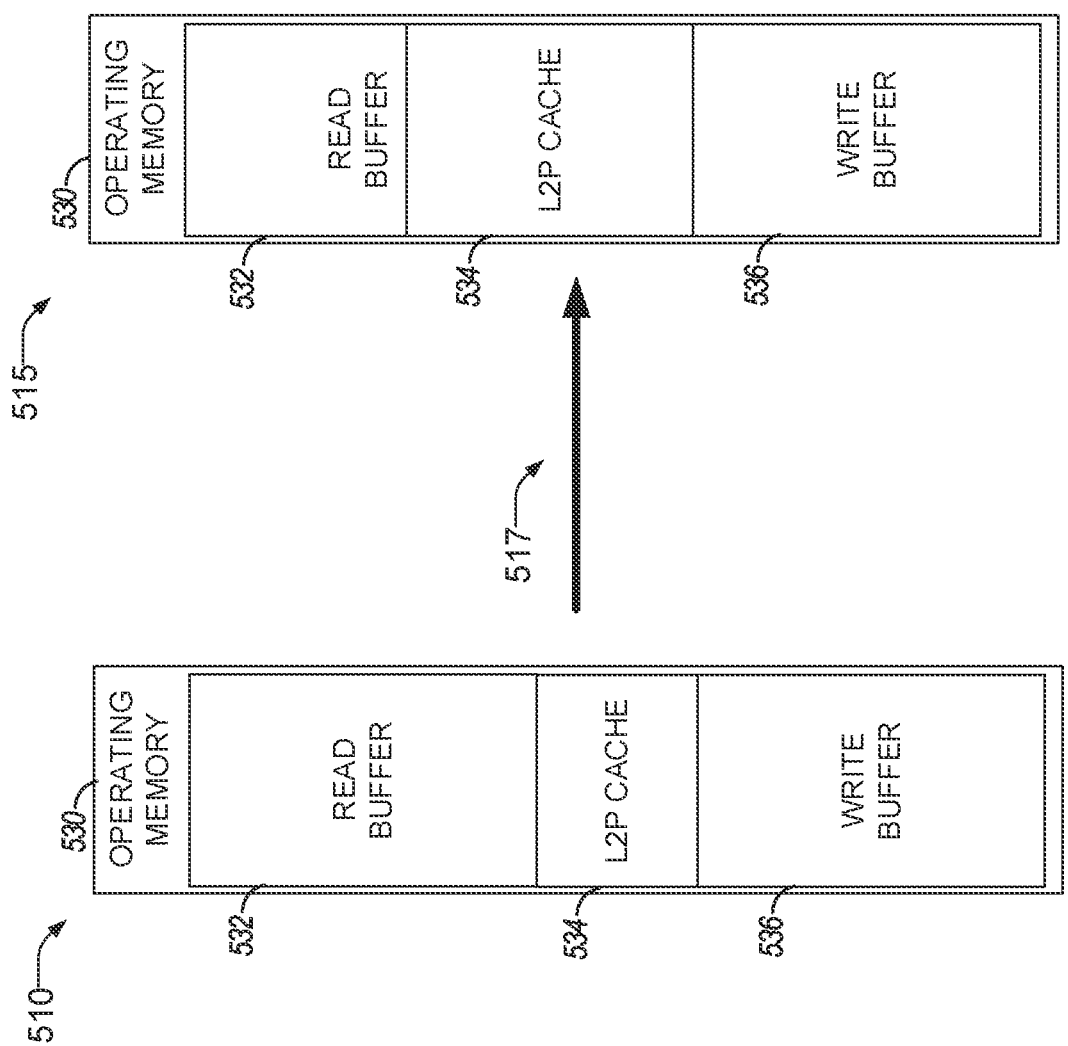
FIG. 5 illustrates an L2P cache memory size adjustment according to some examples of the present disclosure.

FIG. 5 illustrates an L2P cache memory size adjustment according to some examples of the present disclosure. Operating memory 530 may be a non-volatile memory (e.g., an SRAM, a DDR RAM, or the like) that may store data structures, code, variables, and the like for the controller. Operating memory 530 may be tightly coupled, MRAM, or the like. Operating memory 530 may store one or more data structures, for example, a read buffer 532, an L2P cache 534, a write buffer 536, and other structures, code, a command queue and the like (other items not shown for clarity). Read buffer 532 may be utilized to store one or more pages that are read from memory until the host is ready to consume those pages. Write buffer 536 may be utilized by the host to write data to the NAND. The NAND may buffer the data prior to writing to the NAND. L2P cache 534 is a first size at time 510. An operational condition may be detected and the operating memory 530 may be reconfigured 517 such that L2P cache 534 may increase in size at the expense of read buffer 532 as shown at 515. In other examples, the write buffer 536 may be reduced to accommodate the larger size of the L2P cache 534. In still other examples, both the read buffer 532 and the write buffer 536 may be reduced to accommodate the L2P cache 534.

Figure 6:
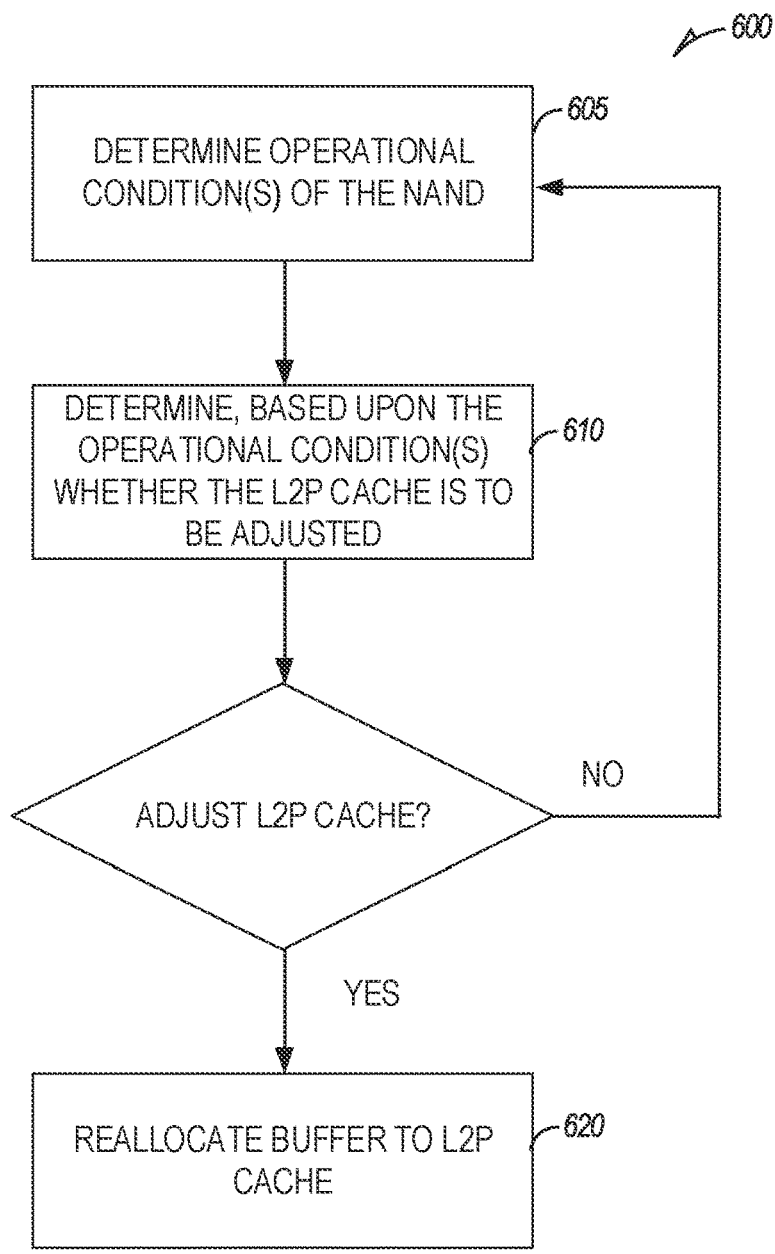
FIG. 6 shows a flowchart of a method of adjusting an L2P cache size based upon an operational condition is shown according to some examples of the present disclosure.

Turning now to FIG. 6 a flowchart of a method 600 of adjusting an L2P cache size based upon an operational condition is shown according to some examples of the present disclosure. At operation 605 the controller may determine one or more operational conditions of the NAND. For example, the controller may determine one or more or a combination of: a command queue depth, command types of the commands in the queue (e.g., write vs. read vs. erase), a cache statistic (e.g., a cache hit or miss ratio), and the like. At operation 610 the controller may determine, based upon the operational characteristic whether the L2P Cache is to be adjusted. For example, based upon one or more rules of a cache profile, may be used to determine whether to increase or decrease the L2P cache based upon the one or more operational conditions. If the cache is not to be adjusted, the system may return to operation 605. For example, determine the operational conditions and check the rules at a later time, determine another operational condition and determine if that operational condition indicates a change in the L2P cache size, and the like. If the L2P cache is to be adjusted, the L2P Cache may be readjusted at operation 620, for example, by reducing the size of a donor memory area of the operating memory. In other examples, the size of the L2P Cache may be decreased by returning the donor memory. The memory area to be increased or decreased may be specified by the cache rules of the cache profile.

Figure 7:
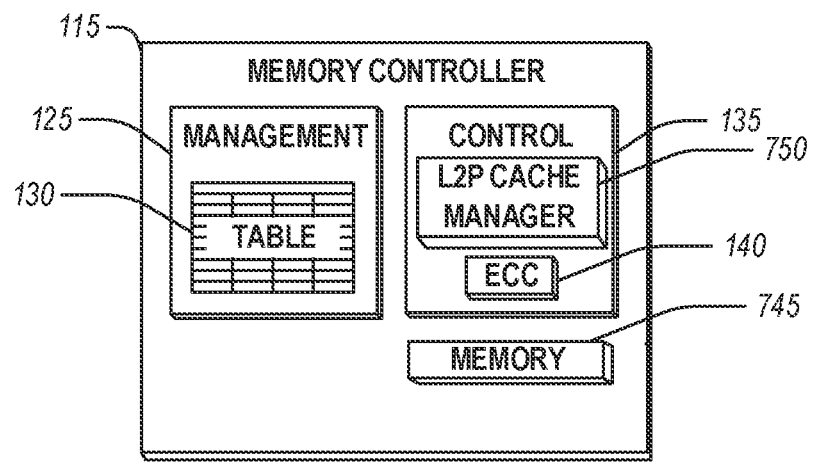
FIG. 7 shows a schematic of a memory controller according to some examples of the present disclosure.

FIG. 7 shows a schematic of a memory controller 115 according to some examples of the present disclosure. In addition to the components shown in FIG. 1, in some examples, the memory controller 115 may have additional components. For example, controller 135 may include a L2P Cache manager 750 which may manage the size of the L2P cache, manage the entries of the L2P table that are in the L2P cache, and the like. For example, the L2P Cache manager 750 may perform the method shown in FIG. 6 to increase or decrease the size of the L2P cache based upon one or more NAND operational conditions. L2P cache, read buffers, and write buffers may be stored in operational memory 745. For example, operational memory 745 may be an embodiment of operating memory 530. Operational memory 745 may be a volatile memory that stores code, buffers, L2P cache, machine readable firmware instructions, and the like. Operational memory 745 may be tightly coupled or be MRAM.

Figure 8:
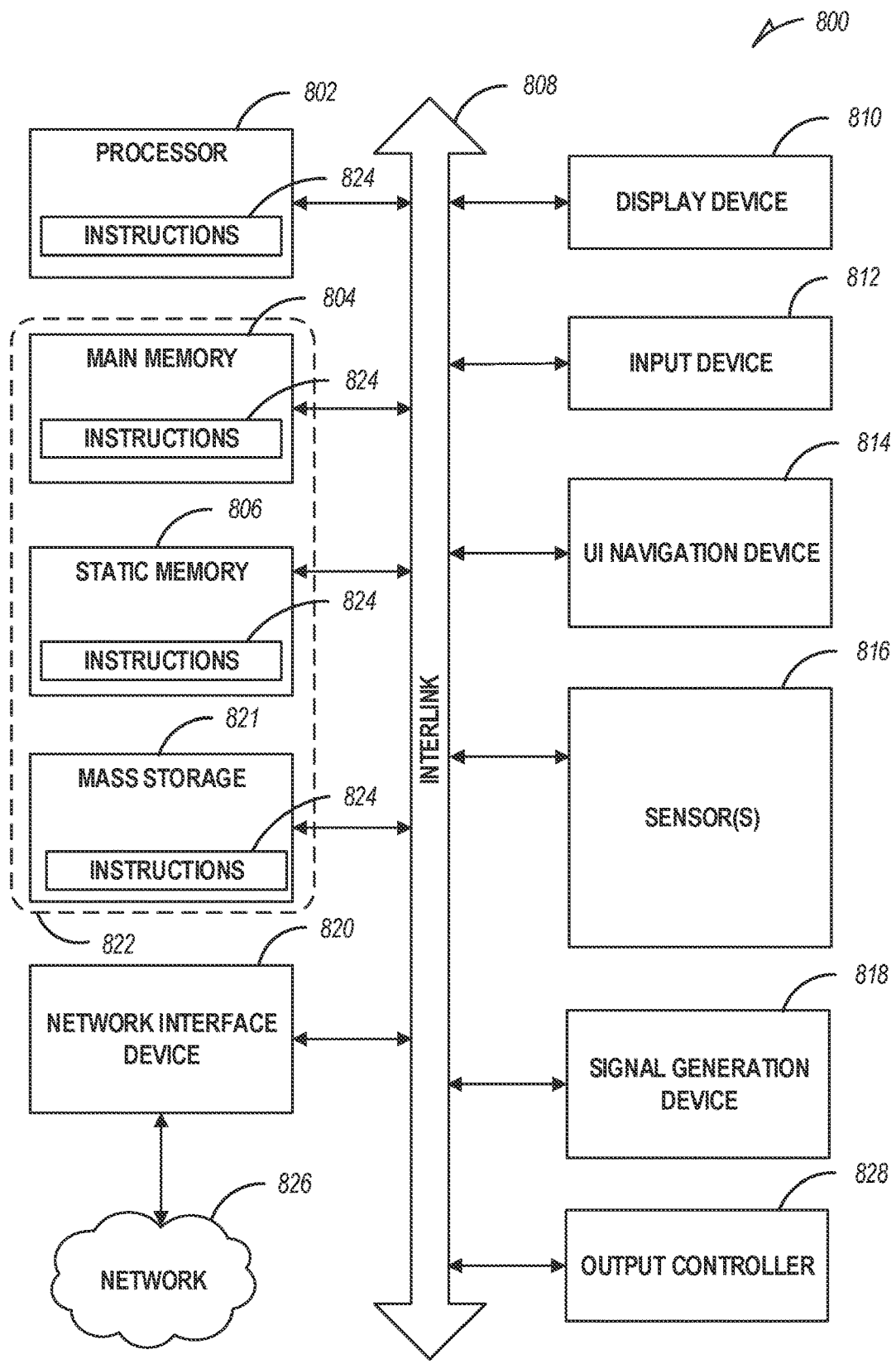
FIG. 8 is a block diagram illustrating an example of a machine upon which one or more embodiments may be implemented.

FIG. 8 illustrates a block diagram of an example machine 800 upon which any one or more of the techniques (e.g., methodologies) discussed herein may perform. In alternative embodiments, the machine 800 may operate as a standalone device or may be connected (e.g., networked) to other machines. In a networked deployment, the machine 800 may operate in the capacity of a server machine, a client machine, or both in server-client network environments. In an example, the machine 800 may act as a peer machine in peer-to-peer (P2P) (or other distributed) network environment. The machine 800 may be a personal computer (PC), a tablet PC, a set-top box (STB), a personal digital assistant (PDA), a mobile telephone, a web appliance, an IoT device, automotive system, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic, components, devices, packages, or mechanisms. Circuitry is a collection (e.g., set) of circuits implemented in tangible entities that include hardware (e.g., simple circuits, gates, logic, etc.). Circuitry membership may be flexible over time and underlying hardware variability. Circuitries include members that may, alone or in combination, perform specific tasks when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable participating hardware (e.g., the execution units or a loading mechanism) to create members of the circuitry in hardware via the variable connections to carry out portions of the specific tasks when in operation. Accordingly, the computer readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

The machine (e.g., computer system) 800 (e.g., the host device 105, the memory device 110, etc.) may include a hardware processor 802 (e.g., a central processing unit (CPU), a graphics processing unit (GPU), a hardware processor core, or any combination thereof, such as the memory controller 115, etc.), a main memory 804 and a static memory 806, some or all of which may communicate with each other via an interlink (e.g., bus) 808. The machine 800 may further include a display unit 810, an alphanumeric input device 812 (e.g., a keyboard), and a user interface (UI) navigation device 814 (e.g., a mouse). In an example, the display unit 810, input device 812 and UI navigation device 814 may be a touch screen display. The machine 800 may additionally include a storage device (e.g., drive unit) 816, a signal generation device 818 (e.g., a speaker), a network interface device 820, and one or more sensors 816, such as a global positioning system (GPS) sensor, compass, accelerometer, or other sensor. The machine 800 may include an output controller 828, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 816 may include a machine readable medium 822 on which is stored one or more sets of data structures or instructions 824 (e.g., software) embodying or utilized by any one or more of the techniques or functions described herein. The instructions 824 may also reside, completely or at least partially, within the main memory 804, within static memory 806, or within the hardware processor 802 during execution thereof by the machine 800. In an example, one or any combination of the hardware processor 802, the main memory 804, the static memory 806, or the storage device 816 may constitute the machine readable medium 822.

While the machine readable medium 822 is illustrated as a single medium, the term "machine readable medium" may include a single medium or multiple media (e.g., a centralized or distributed database, and/or associated caches and servers) configured to store the one or more instructions 824.

The term "machine readable medium" may include any medium that is capable of storing, encoding, or carrying instructions for execution by the machine 800 and that cause the machine 800 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine-readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 824 (e.g., software, programs, an operating system (OS), etc.) or other data are stored on the storage device 821, can be accessed by the memory 804 for use by the processor 802. The memory 804 (e.g., DRAM) is typically fast, but volatile, and thus a different type of storage than the storage device 821 (e.g., an SSD), which is suitable for long-term storage, including while in an "off" condition. The instructions 824 or data in use by a user or the machine 800 are typically loaded in the memory 804 for use by the processor 802. When the memory 804 is full, virtual space from the storage device 821 can be allocated to supplement the memory 804; however, because the storage 821 device is typically slower than the memory 804, and write speeds are typically at least twice as slow as read speeds, use of virtual memory can greatly reduce user experience due to storage device latency (in contrast to the memory 804, e.g., DRAM). Further, use of the storage device 821 for virtual memory can greatly reduce the usable lifespan of the storage device 821.

In contrast to virtual memory, virtual memory compression (e.g., the Linux® kernel feature "ZRAM") uses part of the memory as compressed block storage to avoid paging to the storage device 821. Paging takes place in the compressed block until it is necessary to write such data to the storage device 821. Virtual memory compression increases the usable size of memory 804, while reducing wear on the storage device 821.

Storage devices optimized for mobile electronic devices, or mobile storage, traditionally include MMC solid-state storage devices (e.g., micro Secure Digital (microSD™) cards, etc.). MMC devices include a number of parallel interfaces (e.g., an 8-bit parallel interface) with a host device, and are often removable and separate components from the host device. In contrast, eMMC™ devices are attached to a circuit board and considered a component of the host device, with read speeds that rival serial ATA™ (Serial AT (Advanced Technology) Attachment, or SATA) based SSD devices. However, demand for mobile device performance continues to increase, such as to fully enable virtual or augmented-reality devices, utilize increasing networks speeds, etc. In response to this demand, storage devices have shifted from parallel to serial communication interfaces. Universal Flash Storage (UFS) devices, including controllers and firmware, communicate with a host device using a low-voltage differential signaling (LVDS) serial interface with dedicated read/write paths, further advancing greater read/write speeds.

The instructions 824 may further be transmitted or received over a communications network 826 using a transmission medium via the network interface device 820 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-FI®, IEEE 802.16 family of standards known as WiMax®), IEEE 802.15.4 family of standards, peer-to-peer (P2P) networks, among others. In an example, the network interface device 820 may include one or more physical jacks (e.g., Ethernet, coaxial, or phone jacks) or one or more antennas to connect to the communications network 826. In an example, the network interface device 820 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 800, and includes digital or analog communications signals or other intangible medium to facilitate communication of such software.

The above detailed description includes references to the accompanying drawings, which form a part of the detailed description. The drawings show, by way of illustration, specific embodiments in which the invention can be practiced. These embodiments are also referred to herein as "examples". Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" may include "A but not B," "B but not A," and "A and B," unless otherwise indicated. In the appended claims, the terms "including" and "in which" are used as the plain-English equivalents of the respective terms "comprising" and "wherein". Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

In various examples, the components, controllers, processors, units, engines, or tables described herein can include, among other things, physical circuitry or firmware stored on a physical device. As used herein, "processor" means any type of computational circuit such as, but not limited to, a microprocessor, a microcontroller, a graphics processor, a digital signal processor (DSP), or any other type of processor or processing circuit, including a group of processors or multi-core devices.

The term "horizontal" as used in this document is defined as a plane parallel to the conventional plane or surface of a substrate, such as that underlying a wafer or die, regardless of the actual orientation of the substrate at any point in time. The term "vertical" refers to a direction perpendicular to the horizontal as defined above, Prepositions, such as "on," "over," and "under" are defined with respect to the conventional plane or surface being on the top or exposed surface of the substrate, regardless of the orientation of the substrate; and while "on" is intended to suggest a direct contact of one structure relative to another structure which it lies "on" (in the absence of an express indication to the contrary); the terms "over" and "under" are expressly intended to identify a relative placement of structures (or layers, features, etc.), which expressly includes—but is not limited to—direct contact between the identified structures unless specifically identified as such. Similarly, the terms "over" and "under" are not limited to horizontal orientations, as a structure may be "over" a referenced structure if it is, at some point in time, an outermost portion of the construction under discussion, even if such structure extends vertically relative to the referenced structure, rather than in a horizontal orientation.

The terms "wafer" and "substrate" are used herein to refer generally to any structure on which integrated circuits are formed, and also to such structures during various stages of integrated circuit fabrication. The following detailed description is, therefore, not to be taken in a limiting sense, and the scope of the various embodiments is defined only by the appended claims, along with the full scope of equivalents to which such claims are entitled.

Various embodiments according to the present disclosure and described herein include memory utilizing a vertical structure of memory cells (e.g., NAND strings of memory cells). As used herein, directional adjectives will be taken relative a surface of a substrate upon which the memory cells are formed (i.e., a vertical structure will be taken as extending away from the substrate surface, a bottom end of the vertical structure will be taken as the end nearest the substrate surface and a top end of the vertical structure will be taken as the end farthest from the substrate surface).

As used herein, directional adjectives, such as horizontal, vertical, normal, parallel, perpendicular, etc., can refer to relative orientations, and are not intended to require strict adherence to specific geometric properties, unless otherwise noted. For example, as used herein, a vertical structure need not be strictly perpendicular to a surface of a substrate, but may instead be generally perpendicular to the surface of the substrate, and may form an acute angle with the surface of the substrate (e.g., between 60 and 120 degrees, etc.)

In some embodiments described herein, different doping configurations may be applied to a source-side select gate (SGS), a control gate (CG), and a drain-side select gate (SGD), each of which, in this example, may be formed of or at least include polysilicon, with the result such that these tiers (e.g., polysilicon, etc.) may have different etch rates when exposed to an etching solution. For example, in a process of forming a monolithic pillar in a 3D semiconductor device, the SGS and the CG may form recesses, while the SGD may remain less recessed or even not recessed. These doping configurations may thus enable selective etching into the distinct tiers (e.g., SGS, CG, and SGD) in the 3D semiconductor device by using an etching solution (e.g., tetramethylammonium hydroxide (TMCH)).

Operating a memory cell, as used herein, includes reading from, writing to, or erasing the memory cell. The operation of placing a memory cell in an intended state is referred to herein as "programming," and can include both writing to or erasing from the memory cell (e.g., the memory cell may be programmed to an erased state).

According to one or more embodiments of the present disclosure, a memory controller (e.g., a processor, controller, firmware, etc.) located internal or external to a memory device, is capable of determining (e.g., selecting, setting, adjusting, computing, changing, clearing, communicating, adapting, deriving, defining, utilizing, modifying, applying, etc.) a quantity of wear cycles, or a wear state (e.g., recording wear cycles, counting operations of the memory device as they occur, tracking the operations of the memory device it initiates, evaluating the memory device characteristics corresponding to a wear state, etc.)

According to one or more embodiments of the present disclosure, a memory access device may be configured to provide wear cycle information to the memory device with each memory operation. The memory device control circuitry (e.g., control logic) may be programmed to compensate for memory device performance changes corresponding to the wear cycle information. The memory device may receive the wear cycle information and determine one or more operating parameters (e.g., a value, characteristic) in response to the wear cycle information.

It will be understood that when an element is referred to as being "on," "connected to" or "coupled with" another element, it can be directly on, connected, or coupled with the other element or intervening elements may be present. In contrast, when an element is referred to as being "directly on," "directly connected to" or "directly coupled with" another element, there are no intervening elements or layers present. If two elements are shown in the drawings with a line connecting them, the two elements can be either be coupled, or directly coupled, unless otherwise indicated.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, the code can be tangibly stored on one or more volatile or non-volatile tangible computer-readable media, such as during execution or at other times. Examples of these tangible computer-readable media can include, but are not limited to, hard disks, removable magnetic disks, removable optical disks (e.g., compact discs and digital video disks), magnetic cassettes, memory cards or sticks, random access memories (RAMs), read only memories (ROMs), solid state drives (SSDs), Universal Flash Storage (UFS) device, embedded MMC (eMMC) device, and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

OTHER NOTES AND EXAMPLES

Example 1 is a method performed by a controller of a NAND memory device, the controller in communication with a volatile memory, the method comprising: determining a first operational condition of the NAND device; determining based upon the first operational condition, that an amount of volatile memory allocated to a Logical to Physical (L2P) cache should be increased; responsive to determining that the amount of volatile memory allocated to the L2P cache should be increased, reallocating an amount of volatile memory allocated to a donor memory location to the L2P cache; and storing additional L2P table entries in the L2P cache in a region of the volatile memory previously allocated to the donor memory location and now allocated to the L2P cache as a result of increasing the L2P cache.

In Example 2, the subject matter of Example 1 optionally includes wherein the first operational condition is a command queue depth.

In Example 3, the subject matter of Example 2 optionally includes P) cache should be increased comprises determining that the command queue depth exceeds a determined threshold number of commands.

In Example 4, the subject matter of any one or more of Examples 2-3 optionally include P) cache should be increased comprises determining that the command queue depth exceeds a determined threshold number of commands and the ratio of read commands to write commands exceeds a determined threshold ratio.

In Example 5, the subject matter of Example 4 optionally includes wherein the donor memory location is a read buffer.

In Example 6, the subject matter of any one or more of Examples 2-5 optionally include P) cache should be increased comprises determining that the command queue depth exceeds a determined threshold number of commands and the ratio of write commands to read commands exceeds a determined threshold ratio.

In Example 7, the subject matter of Example 6 optionally includes wherein the donor memory location is a write buffer.

In Example 8, the subject matter of any one or more of Examples 1-7 optionally include wherein the donor memory location is a portion of both a read buffer and a write buffer.

Example 9 is a NAND memory device comprising: a volatile memory; a controller, the controller executing instructions performing operations of: determining a first operational condition of the NAND memory device; determining based upon the first operational condition, that an amount of volatile memory allocated to a Logical to Physical (L2P) cache should be increased; responsive to determining that the amount of volatile memory allocated to the L2P cache should be increased, reallocating an amount of volatile memory allocated to a donor memory location to the L2P cache; and storing additional L2P table entries in the L2P cache in a region of the volatile memory previously allocated to the donor memory location and now allocated to the L2P cache as a result of increasing the L2P cache.

In Example 10, the subject matter of Example 9 optionally includes wherein the first operational condition is a command queue depth.

In Example 11, the subject matter of Example 10 optionally includes P) cache should be increased comprises determining that the command queue depth exceeds a determined threshold number of commands.

In Example 12, the subject matter of any one or more of Examples 10-11 optionally include P) cache should be increased comprises determining that the command queue depth exceeds a determined threshold number of commands and the ratio of read commands to write commands exceeds a determined threshold ratio.

In Example 13, the subject matter of Example 12 optionally includes wherein the donor memory location is a read buffer.

In Example 14, the subject matter of any one or more of Examples 10-13 optionally include P) cache should be increased comprises determining that the command queue depth exceeds a determined threshold number of commands and the ratio of write commands to read commands exceeds a determined threshold ratio.

In Example 15, the subject matter of Example 14 optionally includes wherein the donor memory location is a write buffer.

In Example 16, the subject matter of any one or more of Examples 9-15 optionally include wherein the donor memory location is a portion of both a read buffer and a write buffer.

Example 17 is a machine-readable medium, comprising instructions, which when executed by a machine, causes the machine to perform operations comprising: determining a first operational condition of a NAND memory device; determining based upon the first operational condition, that an amount of volatile memory allocated to a Logical to Physical (L2P) cache should be increased; responsive to determining that the amount of volatile memory allocated to the L2P cache should be increased, reallocating an amount of volatile memory allocated to a donor memory location to the L2P cache; and storing additional L2P table entries in the L2P cache in a region of the volatile memory previously allocated to the donor memory location and now allocated to the L2P cache as a result of increasing the L2P cache.

In Example 18, the subject matter of Example 17 optionally includes wherein the first operational condition is a command queue depth.

In Example 19, the subject matter of Example 18 optionally includes P) cache should be increased comprises determining that the command queue depth exceeds a determined threshold number of commands.

In Example 20, the subject matter of any one or more of Examples 18-19 optionally include P) cache should be increased comprises determining that the command queue depth exceeds a determined threshold number of commands and the ratio of read commands to write commands exceeds a determined threshold ratio.

In Example 21, the subject matter of Example 20 optionally includes wherein the donor memory location is a read buffer.

In Example 22, the subject matter of any one or more of Examples 18-21 optionally include P) cache should be increased comprises determining that the command queue depth exceeds a determined threshold number of commands and the ratio of write commands to read commands exceeds a determined threshold ratio.

In Example 23, the subject matter of Example 22 optionally includes wherein the donor memory location is a write buffer.

In Example 24, the subject matter of any one or more of Examples 17-23 optionally include wherein the donor memory location is a portion of both a read buffer and a write buffer.

Example 25 is a device comprising: means for determining a first operational condition of the NAND device; means for determining based upon the first operational condition, that an amount of volatile memory allocated to a Logical to Physical (L2P) cache should be increased; responsive to determining that the amount of volatile memory allocated to the L2P cache should be increased, means for reallocating an amount of volatile memory allocated to a donor memory location to the L2P cache; and means for storing additional L2P table entries in the L2P cache in a region of the volatile memory previously allocated to the donor memory location and now allocated to the L2P cache as a result of increasing the L2P cache.

In Example 26, the subject matter of Example 25 optionally includes wherein the first operational condition is a command queue depth.

In Example 27, the subject matter of Example 26 optionally includes P) cache should be increased comprises means for determining that the command queue depth exceeds a determined threshold number of commands.

In Example 28, the subject matter of any one or more of Examples 26-27 optionally include P) cache should be increased comprises means for determining that the command queue depth exceeds a determined threshold number of commands and the ratio of read commands to write commands exceeds a determined threshold ratio.

In Example 29, the subject matter of Example 28 optionally includes wherein the donor memory location is a read buffer.

In Example 30, the subject matter of any one or more of Examples 26-29 optionally include P) cache should be increased comprises means for determining that the command queue depth exceeds a determined threshold number of commands and the ratio of write commands to read commands exceeds a determined threshold ratio.

In Example 31, the subject matter of Example 30 optionally includes wherein the donor memory location is a write buffer.

In Example 32, the subject matter of any one or more of Examples 25-31 optionally include wherein the donor memory location is a portion of both a read buffer and a write buffer.

The invention claimed is:

1. A NAND memory device comprising:
a controller;
a volatile memory, storing instructions that, when executed by the controller, cause the controller to perform operations comprising:
determining that a ratio of read commands to write commands in a host command queue exceeds a threshold value;
responsive to determining that the ratio of read commands to write commands exceeds the threshold value, incrementally reallocating, over a defined time period, a region of volatile memory allocated to a write buffer of the NAND memory device to a L2P cache; and
storing additional L2P entries in the L2P cache at least partially in the region of volatile memory previously allocated to the write buffer.

2. The NAND memory device of claim 1, wherein the operations of incrementally reallocating, over a defined time period, the region of volatile memory allocated to the write buffer of the NAND memory device to the L2P cache comprises reallocating write buffer memory to the L2P cache by a predefined amount every predefined time period.

3. The NAND memory device of claim 1, wherein the operations further comprise:
subsequent to completing the incremental reallocation, determining that the ratio of read commands to write commands no longer exceeds the threshold value; and
responsive to determining that the ratio of read commands to write commands no longer exceeds the threshold value, decreasing a size of the L2P cache by reallocating a region of volatile memory allocated to the L2P cache of the NAND memory device to the write buffer.

4. The NAND memory device of claim 1, wherein the operations further comprise:
calculating a size of the region of volatile memory to reallocate to the L2P cache from the write buffer based upon the ratio of read commands to write commands; and
wherein the operations of incrementally reallocating, over the defined time period, the region of volatile memory allocated to the write buffer of the NAND memory device to the L2P cache comprises incrementally reallocating, over the defined time period the region of volatile memory of the calculated size allocated to the write buffer of the NAND memory device to the L2P cache.

5. The NAND memory device of claim 4, wherein the operations further comprise:
restricting the calculated size to a prespecified size.

6. The NAND memory device of claim 1, wherein the operations further comprise: subsequent to completing the incremental reallocation, reallocating the region of volatile memory reallocated from the write buffer to the L2P cache back to the write buffer over a period of time.

7. The NAND memory device of claim 1, wherein the operations of incrementally reallocating, over the defined time period, the region of volatile memory allocated to the write buffer of the NAND memory device to the L2P cache comprises incrementally updating a memory pointer marking a boundary of the L2P cache and the write buffer.

8. The NAND memory device of claim 1, wherein the operations of incrementally reallocating, over the defined time period, the region of volatile memory allocated to the write buffer of the NAND memory device to the L2P cache is performed responsive to determining that the ratio of read commands to write commands exceeds the threshold value and responsive to determining that a second L2P cache rule is satisfied.

9. The NAND memory device of claim 8, wherein the second L2P cache rule is a L2P cache hit percentage.

10. The NAND memory device of claim 1, wherein the operations further comprise:
receiving a write command, the write command changing a content of an L2P table stored in the L2P cache; and
storing the changed content of the L2P table in an update list.

11. A NAND memory device comprising:
a controller;
a volatile memory, storing instructions that, when executed by the controller, cause the controller to perform operations comprising:
determining that a ratio of write commands to read commands in a host command queue exceeds a threshold value;
responsive to determining that the ratio of write commands to read commands exceeds the threshold value, incrementally reallocating, over a defined time period, a region of volatile memory allocated to a read buffer of the NAND memory device to a L2P cache; and
storing additional L2P entries in the L2P cache at least partially in the region of volatile memory previously allocated to the read buffer.

12. The NAND memory device of claim 11, wherein the operations of incrementally reallocating, over a defined time period, the region of volatile memory allocated to the read buffer of the NAND memory device to the L2P cache comprises reallocating read buffer memory to the L2P cache by a predefined amount every predefined time period.

13. The NAND memory device of claim 11, wherein the operations further comprise:
subsequent to completing the incremental reallocation, determining that the ratio of read commands to write commands no longer exceeds the threshold value; and
responsive to determining that the ratio of read commands to write commands no longer exceeds the threshold value, decreasing a size of the L2P cache by reallocating a region of volatile memory allocated to the L2P cache of the NAND memory device to the read buffer.

14. The NAND memory device of claim 11, wherein the operations further comprise:
calculating a size of the region of volatile memory to reallocate to the L2P cache from the read buffer based upon the ratio of read commands to write commands; and
wherein the operations of incrementally reallocating, over the defined time period, the region of volatile memory allocated to the read buffer of the NAND memory device to the L2P cache comprises incrementally reallocating, over the defined time period the region of volatile memory of the calculated size allocated to the read buffer of the NAND memory device to the L2P cache.

15. The NAND memory device of claim 14, wherein the operations further comprise:
   restricting the calculated size to a prespecified size.

16. The NAND memory device of claim 11, wherein the operations further comprise: subsequent to completing the incremental reallocation, reallocating the region of volatile memory reallocated from the read buffer to the L2P cache back to the read buffer over a period of time.

17. The NAND memory device of claim 11, wherein the operations of incrementally reallocating, over the defined time period, the region of volatile memory allocated to the read buffer of the NAND memory device to the L2P cache comprises incrementally updating a memory pointer marking a boundary of the L2P cache and the read buffer.

18. The NAND memory device of claim 11, wherein the operations of incrementally reallocating, over the defined time period, the region of volatile memory allocated to the read buffer of the NAND memory device to the L2P cache is performed responsive to determining that the ratio of read commands to write commands exceeds the threshold value and responsive to determining that a second L2P cache rule is satisfied.

19. The NAND memory device of claim 18, wherein the second L2P cache rule is a L2P cache hit percentage.

20. The NAND memory device of claim 11, wherein the operations further comprise:
   receiving a write command, the write command changing a content of an L2P table stored in the L2P cache; and
   storing the changed content of the L2P table in an update list.

* * * * *